United States Patent
Sekimoto (10) Patent No.: US 7,844,386 B2
(45) Date of Patent: Nov. 30, 2010

(54) REFERENCE SIGNAL GENERATOR AND METHOD

(75) Inventor: Kouji Sekimoto, Kitamoto (JP)

(73) Assignee: A & D Company, Ltd., Tokyo (JP)

( * ) Notice: Subject to any disclaimer, the term of this patent is extended or adjusted under 35 U.S.C. 154(b) by 338 days.

(21) Appl. No.: 11/887,217

(22) PCT Filed: Mar. 28, 2005

(86) PCT No.: PCT/JP2005/005718
§ 371 (c)(1),
(2), (4) Date: Sep. 26, 2007

(87) PCT Pub. No.: WO2006/103730
PCT Pub. Date: Oct. 5, 2006

(65) Prior Publication Data
US 2009/0271089 A1  Oct. 29, 2009

(51) Int. Cl.
G01R 25/00 (2006.01)
G06F 17/40 (2006.01)
G01L 3/00 (2006.01)
G01L 3/26 (2006.01)
F02P 5/00 (2006.01)

(52) U.S. Cl. .................. 701/103; 702/79; 702/187; 73/114.22; 73/114.24; 73/114.25; 73/114.26; 123/406.59; 123/406.6

(58) Field of Classification Search .......... 123/612, 123/406.59, 406.63; 701/103, 111, 115; 73/114.25–114.28, 489, 491, 514.39; 702/33, 702/79, 80, 187
See application file for complete search history.

(56) References Cited

U.S. PATENT DOCUMENTS

| 4,140,083 | A |   | 2/1979 | Frobenius |
| 4,471,653 | A | * | 9/1984 | Kawamura et al. ........ 73/114.26 |
| 4,653,454 | A | * | 3/1987 | Konishi et al. ............ 123/506 |
| 5,721,546 | A |   | 2/1998 | Tsutsumishita |

(Continued)

FOREIGN PATENT DOCUMENTS

JP  53-65531  6/1978

(Continued)

*Primary Examiner*—Stephen K Cronin
*Assistant Examiner*—Raza Najmuddin
(74) *Attorney, Agent, or Firm*—Jordan and Hamburg LLP (57) ABSTRACT

A reference signal generator generating a reference signal for high-resolution measurement/control in real time includes a means for calculating the rotational trend, e.g. increase/decrease in the r.p.m., of an engine when a first tooth is detected by an angle sensor at the (n−1)-th cycle according to the mutual relation between the time interval between the first tooth and a second tooth just before the first tooth at the (n−1)-th cycle of the engine rotation and the time interval between the first tooth and a third tooth just after the first tooth, a rotation time predicting means for predicting the time interval between the first tooth and the third tooth at the n-th cycle by reflecting the rotational trend on the time interval between the first tooth and the second tooth at the n-th cycle, and a means for generating a reference signal by dividing a predicted time interval in correspondence with a predetermined angle resolution during the time after the first tooth is detected by the angle sensor at the n-th cycle till the third tooth is detected by the same.

14 Claims, 8 Drawing Sheets

U.S. PATENT DOCUMENTS

| | | |
|---|---|---|
| 7,266,567 B2 | 9/2007 | Inenaga et al. |
| 2005/0212508 A1 * | 9/2005 | Damitz et al. ............ 324/207.2 |

FOREIGN PATENT DOCUMENTS

| | | |
|---|---|---|
| JP | 63-229321 | 9/1988 |
| JP | 3-262003 | 11/1991 |
| JP | 5-55709 | 7/1993 |
| JP | 7-33809 | 6/1995 |
| JP | 8-261794 | 10/1996 |
| JP | 10-300525 | 11/1998 |
| JP | 2003-185472 | 7/2003 |

* cited by examiner

REFERENCE SIGNAL GENERATOR AND METHOD

BACKGROUND OF THE INVENTION

The present invention relates to a reference signal generator and method for measuring and controlling a rotating object.

In recent years, an ECU (Electronic Control Unit) has been used for the purposes of measuring the output performance and controlling the fuel injection rate, injection and ignition timing and the like of an automobile internal combustion engine (hereinafter referred to as an "engine"). Examples of patent applications relating to a method and apparatus for controlling the operation of an engine include Japanese Laid-open Patent Application No. 53-65531, Japanese Patent Publication No. 7-33809, Japanese Patent No. 3262003.

In an engine, the relationship between the output rotational speeds and strokes such as fuel injection, compression, combustion, and exhaust changes in accordance with the number of cylinders and the number of cycles. Therefore, these data are measured for each rotational angle of the crankshaft connected to the pistons in the engine when output characteristics such as the rotational torque of the engine, the rotational speed, and the rotational velocity are normally measured.

An ECU ordinarily controls an engine by controlling the fuel injection rate, injection and ignition timing, and other parameters with reference to the rotational angle of the crankshaft. The combustion characteristics and the output torque characteristics vary in accordance with this ignition timing control, and the amount of NOx, PM, and other toxic substances contained in the exhaust gas after combustion changes. Therefore, obtaining accurate measurement data and achieving optimal ignition timing are important techniques.

Conventionally, a cogwheel-shaped disk to which teeth (projections or notches) are provided at fixed intervals is mounted on the crankshaft of the engine as described in Patent Document 1, an electromagnetic pickup or an optical sensor detects the teeth when the crankshaft is rotating in order to detect the rotational angle, and the detection signal is used to carry out the above-described measurement and control.

With the internal combustion engine controller of Patent Document 1, the angular resolution is 1 degree, and there are therefore 360 teeth. The usual number of teeth is 60 or 36 (for resolutions of 6 degrees and 10 degrees).

However, the controller of such and internal combustion has the following technical problems.

Patent Document 1: Japanese Patent Publication No. 5-55709

Angular resolutions such as 1, 6, and 10 degrees noted above are insufficient for precise measurement and control. However, it is difficult to achieve greater resolutions due to physical limitations and production limits of the disk.

With ECU control in particular, the ignition timing must be predicted, and since the rotational state of the engine is not constant, the ignition timing is difficult to predict and real time control cannot be carried out.

With the problems of the aforedescribed prior art in view, it is an object of the present invention to provide a reference signal generator that can generate, in real time, reference signals for data measurement and engine control at a high resolution (e.g., 0.1 degree or less), in accordance with a rotational state that changes moment to moment, while using a conventional cogwheel-shaped angle detection mechanism.

SUMMARY OF THE INVENTION

In order to achieve the above-state object, the reference signal generator of the present invention is a reference signal generator in which an angle sensor fixedly disposed on a rotating object sequentially detects a plurality of teeth that is mounted at fixed angular intervals on the rotating object, whereby a time interval between adjacent teeth is measured and measurement and control reference signals that correspond to an arbitrary rotational angle are generated, the reference signal generator characterized in comprising rotational trend calculating means for calculating, based on a time interval between a second tooth immediately prior to a first tooth in the $(n-k)^{th}$ cycle (n, k: natural numbers, and n>k) of rotation of the rotating object and the first tooth, and the interrelation between the time interval between the first tooth and a third tooth immediately after the first tooth, an increase, a decrease, and other rotational trends in the rotational speed of the rotating object when the first tooth is detected by the angle sensor in the $n-k^{th}$ cycle; rotation time predicting means for causing the rotational trend to be reflected in the time interval between the second tooth in the $n^{th}$ cycle and the first tooth, and predicting the time interval between the first tooth in the $n^{th}$ cycle and the third tooth; and reference signal generating means for generating a reference signal in which the predicted time interval that has been subdivided according to a prescribed angular resolution in an interval originating from when the angle sensor detects the first tooth in the $n^{th}$ cycle to when the angle sensor detects the third tooth.

The reference signal generating method of the present invention is a reference signal generating method in which an angle sensor fixedly disposed on a rotating object sequentially detects a plurality of teeth that is mounted at fixed angular intervals on the rotating object, whereby a time interval between adjacent teeth is measured and measurement and control reference signals that correspond to an arbitrary rotational angle are generated, the reference signal generator characterized in comprising: calculating, based on a time interval between a second tooth immediately prior to a first tooth in the $(n-k)^{th}$ cycle (n, k: natural numbers, and n>k) of rotation of the rotating object and the first tooth, and the interrelation between the time interval between the first tooth and a third tooth immediately after the first tooth, an increase, a decrease, and other rotational trends in the rotational speed of the rotating object when the first tooth is detected by the angle sensor in the $n-k^{th}$ cycle; causing the rotational trend to be reflected in the time interval between the second tooth in the $n^{th}$ cycle and the first tooth, and predicting the time interval between the first tooth in the $n^{th}$ cycle and the third tooth; and generating a reference signal in which the predicted time interval that has been subdivided according to a prescribed angular resolution in an interval originating from when the angle sensor detects the first tooth in the $n^{th}$ cycle to when the angle sensor detects the third tooth.

In accordance with these configurations, the time interval to be predicted between teeth is predicted by reflecting the rotational trend of the same tooth of the same cycle in the past in the time interval data of the immediately preceding tooth interval. Therefore, a highly precise reference signal in which the characteristics of the predicted tooth and the rotational trend are incorporated into the immediately preceding time interval, and real time ECU-based measurement and control can be achieved.

The reference signal generating means may cause the rotational trend to be reflected in a mode for generating the reference signal.

The reference signal generating method may cause the rotational trend to be reflected in a mode for generating the reference signal.

In this manner, reference signal precision can be improved and highly accurate measurement and control can be carried out because the slope of the change in rotational speed can be added between a plurality of reference signals generated between teeth by changing the mode for generating a reference signal in accordance with the rotational trend of past cycles of the same tooth.

The reference signal generating means may calculate as the rotational trend a degree of variation in the rotational speed of the rotating object when the first tooth is detected by the angle sensor in the $(n-k)^{th}$ cycle.

The reference signal generating method calculate as the rotational trend a degree of variation in the rotational speed of the rotating object when the first tooth is detected by the angle sensor in the $(n-k)^{th}$ cycle.

In this manner, the amount of variation in the rotational speed is used as the rotational trend, this is reflected in the mode for generating a reference signal, and the reference signal can be made to follow changes in the rotational speed. The difference from the reference signal generated for the tooth that predicts the next time interval is thereby smoothed and the measurement and control precision is improved for the particular case in which the amount of change in the rotational speed is considerable.

The rotation time predicting means may express the time interval measured between the teeth as a quotient and remainder found by dividing the time interval by the numerical value obtained based on the resolution, and predicts the time interval on the basis of the quotient and remainder; and the quotient and remainder are determined based on an output value of a counter that overflows for each numerical value obtained based on the resolution.

The reference signal generating method may express the time interval measured between the teeth as a quotient and remainder found by dividing the time interval by the numerical value obtained based on the resolution, and predicts the time interval on the basis of the quotient and remainder; and the quotient and remainder are determined based on an output value of a counter that overflows for each numerical value obtained based on the resolution.

In this manner, the time interval between teeth is expressed as a quotient and remainder rather than using division. The time interval can thereby be predicted using the quotient and remainder in the same manner thereafter, and real time measurement and control is achieved because a reference signal can be immediately generated from the predicted quotient and remainder.

The rotating object may be an automobile engine, and the reference signal may be used as an opportunity for measuring rotational torque, rotational speed, and other output characteristics of the engine; and/or controlling an amount of fuel to be injected and injection and ignition timing via an ECU.

The slope of the change in rotational speed is greater particularly when the rotational speed of the engine is low in comparison to when the rotational speed is high. Measurements and control must therefore be carried out immediately with good precision in accordance with changes in the rotational speed in order to reduce exhaust gas pollution, improve fuel consumption, and achieve other aims. Therefore, it is expected that the present invention will be sufficiently useful for conventional ECU-based real time measurement and control.

In accordance with the reference signal generator and method according to the present invention, the time interval to be predicted between teeth is predicted by reflecting the rotational trend of the same tooth of the same cycle in the past in the time interval data of the immediately preceding tooth interval. Therefore, a highly precise reference signal in which the characteristics of the predicted tooth and the rotational trend are incorporated into the immediately preceding time interval, and real time ECU-based measurement and control can be achieved.

The time interval between teeth is expressed as a quotient and remainder rather than using division. The time interval can thereby be predicted using the quotient and remainder in the same manner thereafter, and real time measurement and control is achieved because a reference signal can be immediately generated from the predicted quotient and remainder.

The slope of the change in rotational speed is greater particularly when the rotational speed of the engine is low in comparison with when the rotational speed is high. Measurements and control must therefore be carried out immediately with good precision in accordance with changes in the rotational speed in order to reduce exhaust gas pollution, improve fuel consumption, and achieve other aims. Therefore, it is expected that the present invention will be sufficiently useful to the ECU in order to highly precise measurement and control in real time.

DETAILED DESCRIPTION OF THE INVENTION

Figure 1:
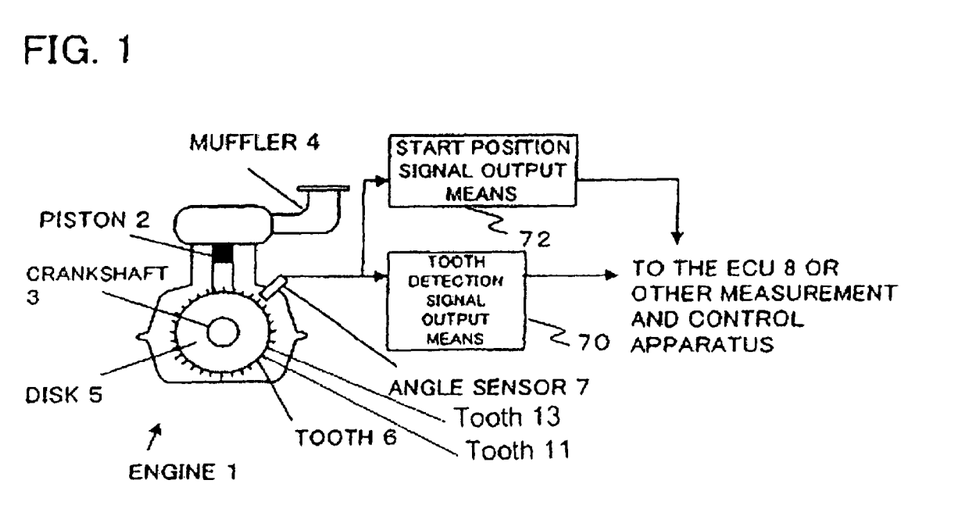
FIG. 1 is a diagram showing a schematic configuration of an engine and a rotational angle detection mechanism of the engine.

Preferred embodiments of the present invention are described below in detail with reference to the attached diagrams. FIG. 1 is a diagram showing a schematic configuration of an engine 1, which is the object of measurement and control by an ECU 8 or another apparatus, and a rotational angle detection mechanism of the engine 1.

The engine 1 is cylindrically shaped, compresses and combusts gasoline that has been drawn in, and generates heat energy via a chemical reaction between the combusted gas (hydrocarbon) and oxygen in the air taken in from a valve (not shown). The heat energy pushes a piston 2 downward causing a crankshaft 3 connected to the piston 2 to rotate and tires (not shown) connected to the crankshaft 3 to rotate. Fuel that serves as the motive force for this rotation is exhausted as exhaust gas from a muffler 4. In this manner, a 4-cycle engine has four strokes, i.e., intake, compression, combustion, and exhaust that are carried out in a single cycle for two rotations (720 degrees) of the crankshaft 3. In contrast, a 2-cycle engine carries out four strokes that are carried out in a single rotation (360 degrees) of the crankshaft.

A 4-cycle engine is also referred to as 4-stroke engine because the piston makes two reciprocations (4-strokes) in a vertical direction within the cylinder. A 2-cycle engine is also referred to as a 2-stroke engine. In the case of a multi-cylinder engine, each of the cylinders carries out four strokes in a prescribed order at offset cycles while the crankshaft makes two rotations (in the case of four cycles). For example, in the case of a 4-cycle engine having four cylinders, the cycles are offset by 180 degrees, four strokes are carried out in the order of "1-3-2-4," and combustion is carried out continuously within the engine.

As described above, the amount that the crankshaft rotates during 4 strokes is different depending on the number of cycles. Therefore, the four strokes, i.e., intake, compression, combustion, and exhaust will hereinafter be referred to as a single cycle of engine rotation. Therefore, in the case of a 4-cycle engine, a single cycle corresponds to two rotations (720 degrees) of the crankshaft, and in the case of a 2-cycle engine, a single cycle corresponds to a single rotation (360 degrees) of the crankshaft.

A cogwheel-shaped disk 5 to which teeth 6 (projections or notches) have been provided at fixed intervals is mounted on outer periphery of the crankshaft 3 shown in FIG. 1, and the disk 5 rotates together in concert with the rotation of the crankshaft 3. In the present embodiment, a total of 60 teeth including tooth 6, tooth 11, and tooth 13 are provided at 6 degree intervals, but a total of 36 teeth may be provided at 10 degree intervals. In an embodiment to be described later, a portion of the positions in which teeth are expected to be provided is used as a reference position for counting the number of rotations (cycles) of the crankshaft, or used as reference positions for counting the tooth number for identifying each of the teeth, and teeth are therefore not provided (teeth are left out) or are provided at shorter intervals than usual.

An angle sensor 7 is composed of an electromagnetic pickup or an optical sensor, and is fixedly disposed in prescribed locations (in the present embodiment, prescribed locations in the outer vicinity of the disk 5) of the engine 1, which is the rotating object.

Tooth detection signal output means 70 receives electric current or electromotive force (voltage) generated from the angle sensor 7, and outputs, based on variations in the electromotive force or electric current, a pulsed tooth detection signal each instance a tooth comes into close proximity to the angle sensor 7 in concert with the rotation of the crankshaft 3.

Start position signal output means 72 assigns a tooth number that identifies each tooth, and therefore outputs, via a pilot pulse or the like, a start position signal wherein the portion lacking a tooth or the portion in which the teeth are provided at shorter intervals than usual acts as a number start position. When this start position signal is detected, not only can a tooth number be sequentially assigned to the teeth, the number of rotations and the rotational speed (velocity) can also be calculated, and the information is sent to the ECU 8 or another measurement and control apparatus and used as required.

The time interval between the tooth detection signal of a tooth and the tooth detection signal of an adjacent (immediately prior or immediately following) tooth has an angular resolution (e.g., a resolution of 6 degrees when there are 60 teeth) that is unambiguously set in accordance with the number of teeth on the disk. Therefore, the tooth detection signal is used as a reference signal for controlling the ignition timing of the engine and when data required by the ECU 8 is measured. For example, output characteristics such as the output torque, rotational speed, and rotational velocity are measured in accordance with the rotational angles while taking advantage of the reference signal output, and when fuel ignition control is desired at a certain rotational angle, an ignition command is issued while taking advantage of the reference signal output that corresponds to the rotational angle. In other words, the reference signal is a signal that is output in accordance with a rotational angle in order to carry out measurement and control.

Since the distance (angle) between adjacent teeth is known, the rotational speed (rotational angle) of the crankshaft can be calculated by measuring the time interval of two adjacent tooth detection signals using a counter or the like.

In this manner, a rotational angle detection mechanism of the rotating object is composed of the cogwheel-shaped disk 5, the angle sensor 7, the tooth detection signal output means 70, and the start position signal output means 72, and the configuration is known in the art. However, when an attempt is made to achieve an even higher resolution using such a cogwheel-shaped disk 5, problems are presented in regard to physical limits and limits in terms of production, and more precise measurement and control cannot be performed because the number of teeth cannot be realistically increased limitlessly.

For this reason, in recent years, the optimal ignition timing is predicted by digital processing, and ignition timing is fine tuned based on time (e.g., Japanese Laid-open Patent Application No. 53-65531), using detected teeth as a reference.

However, the rotational output of an engine constantly varies depending on piston movement and stroke, even if the average output is set and controlled in advance. For example, the rotational speed is reduced near top dead center, is increased near bottom dead center, tends to decrease in the compression stroke, and tends to increase in the combustion/firing stroke. The variation in the rotational speed is greater at low speed rotation than at high speed rotation. In the case of a multi-cylinder engine, the rotational speed also changes due to variability between cylinders.

Specifically, in engine testing, the rotational speed changes moment to moment and is not constant. Therefore, as long as the rotational speed is not constant, it is impossible to predict the time (the time interval between adjacent teeth) until the next tooth is detected after the angle sensor has detected a tooth (the output interval of the reference signal is a predetermined time interval when the rotational speed is constant), and with a method that determines measurement and control timing by adjusting the time using a detected tooth as a reference, fuel injection cannot necessarily be carried out with optimal timing and this does not contribute to true higher angular resolution.

In view of the above, the present invention predicts the time interval between teeth mounted on a rotating object in which the rotational state is constantly changing, and generates at higher resolution a reference signal that is required for measurement and control while using a conventional rotational angle detection mechanism that has not bee altered.

A first characteristic of the reference signal generator of the present invention is that, based on a time interval between a second tooth 6 immediately prior to a first tooth 11 in the $(n-k)^k$ cycle (n, k: natural numbers, and n>k) of rotation of the rotating object and the first tooth, and the interrelation between the time interval between the first tooth 11 and a third tooth 13 immediately after the first tooth 11, an increase, a decrease, and other rotational trends in the rotational speed of the rotating object are calculated when the first tooth 11 is detected by the angle sensor in the n–k$^{th}$ cycle; the rotational trend is caused to be reflected in the time interval between the second tooth 6 in the nth cycle and the first tooth 11, and the time interval between the first tooth 11 in the nth cycle and the third tooth 13 is predicted; and a reference signal in which the predicted time interval that has been subdivided according to a prescribed angular resolution is generated in an interval originating from when the angle sensor detects the first tooth 11 in the nth cycle to when the angle sensor detects the third tooth 13.

Figure 2:
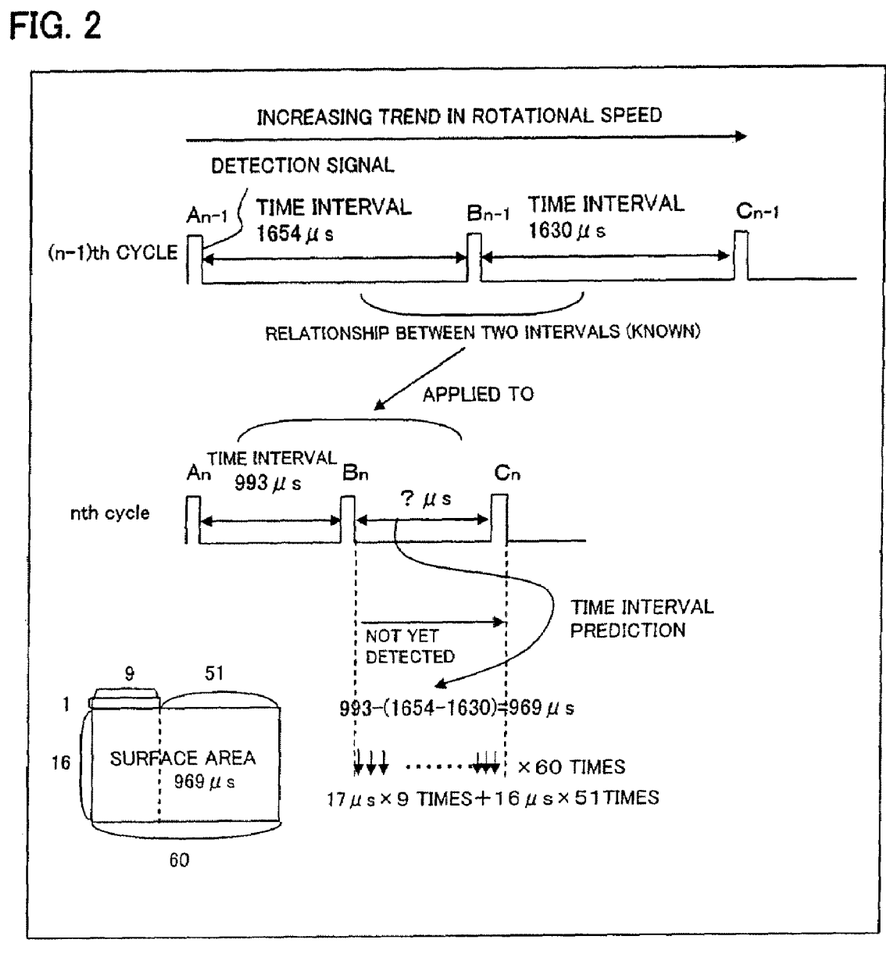
FIG. 2 is a diagram showing an example for describing the basic configuration of the present invention.

FIG. 2 shows an example that describes the basic concept of the present invention. In FIG. 2, the case is considered in which a disk is mounted on the crankshaft of an engine that is to be measured and controlled, and the crankshaft rotates at an initial rotational speed of 600 rpm and increases rotational speed at a uniform rate for one second to a final rotational speed of 6,000 rpm. In this case, the four strokes (a single cycle), i.e., intake, compression, combustion, and exhaust of the engine, are a single cycle (two rotations of the crankshaft). Also, teeth disposed at 6 degree intervals in a continuous fashion at arbitrary positions of the disk are referred to in sequence as A, B, and C, and the teeth that the angle sensor detects every $n^{th}$ cycle are referred to as $A_n$, $B_n$, and $C_n$.

When the engine begins to rotate and the angle sensor detects a tooth, the tooth detection signal output means outputs a pulsed tooth detection signal such as that shown in FIG. 2. The upper portion of FIG. 2 shows the tooth detection signal outputted when the teeth A, B, and C (e.g., tooth 6, tooth 11, tooth 13, respectively) have passed in sequence in the proximity of the angle sensor during the (n−1)th cycle of the engine, and also shows the result of measuring the time from when a tooth detection signal is outputted until the next tooth detection signal is outputted. In the (n−1)th cycle, the time interval between tooth A and tooth B is 1,654 μs, and the time interval between tooth B and tooth C is 1,630 μs. In this manner, as long as the rotation is not uniform, the time interval thus measured varies depending on the reference signal even if the teeth are disposed at the same 6 degree intervals, and in this example, the reference signal (or velocity) is in an increasing trend because the time interval thus measured is shorter (1,654>1,630).

In this case, the interrelation between the two intervals, i.e., the time interval between the tooth $A_{n-1}$ and the tooth $B_{n-1}$, and the interval between the tooth $B_{n-1}$ and the tooth $C_{n-1}$, is ascertained for the time interval measured between the two intervals in order to predict the time interval between the tooth $B_n$ and the tooth $C_n$ at the same time that the angle sensor detects the tooth $B_n$ in the $n^{th}$ cycle, as shown in center portion of FIG. 2. This relationship may be applied to the interval between the tooth $A_n$ and the tooth $B_n$, and the unknown interval between the tooth $B_n$ and the tooth $C_n$.

More specifically, when the rotational speed of the rotating object is ascertained based on the interrelation between the interval between the tooth $A_{n-1}$ and the tooth $B_{n-1}$ and the interval between the tooth $B_{n-1}$ and the tooth $C_{n-1}$ when the teeth A, B, and C are detected by the angle sensor, the difference between the two time intervals is 1,654−1,630=24 μs, and it is apparent that the rotational speed is in an increasing trend. When the time interval between the tooth $A_n$ and the tooth $B_n$ is calculated, and the rotational trend of the rotating object when the same tooth from the preceding cycle has been detected by the angle sensor is applied to the interrelation between the time interval between the tooth $A_n$ and the tooth $B_n$ of the $n^{th}$ cycle and the time interval between the tooth $B_n$ and the tooth $C_n$, the time interval between the tooth $B_n$ and the tooth $C_n$, i.e., the time between when the tooth $B_n$ is detected by the angle sensor until the tooth $C_n$ is detected is estimated to be the time when 993 (the time interval between the tooth $A_n$ and the tooth $B_n$)−24=969 μs have passed. This estimation method is referred to as so-called extrapolation.

In this manner, the rotational trend of the rotating object, when the same tooth of the same cycle (the combustion stroke in the case of the combustion stroke) in the past is detected by the angle sensor, is reflected in the time interval between the tooth interval that immediately precedes the predicted tooth interval and prediction is carried out. Therefore, the characteristics of the tooth and the rotational trend are incorporated into the immediately preceding time interval data, and the prediction accuracy is improved. For example, even when the machining precision of the teeth is poor, a tooth is missing, or in other circumstances, such production mistakes and the effect of aging deterioration can be offset when the time interval between the teeth is predicted because the relationship with the past cycle of the same tooth is used.

Furthermore, since the angular resolution between the tooth $B_n$ and the tooth $C_n$ is improved, the time interval between the tooth $B_n$ and the tooth $C_n$ predicted by extrapolation in advance is divided (interpolated) so as to achieve a desired resolution, and a reference signal can be generated (see the lower portion of FIG. 2). For example, when control by ECU or other means is desired at a resolution of 0.1 degree, which is 1/60 of a tooth interval of 6 degrees, the 969 μs calculated in advance is divided into 60 equal intervals, and while the angle sensor detects the tooth $B_n$, a reference signal for each of the 60 equal intervals can be continuously generated for 60 cycles (60 pulses) until 969 μs has elapsed. The ECU thereby carries out measurement and control in real time.

In this case, what is important when the predicted time interval between the tooth $B_n$ and the tooth $C_n$ is divided is that the rotational trend of a past cycle of the same tooth is reflected in the mode for generating a reference signal. This is the second characteristic of the present invention. In the example in FIG. 2, 969/60=16 with a remainder of 9, for example, and the rotational movement of the engine at this time is known to be in an increasing trend of rotational speed based on the measured results of the time interval between the tooth $A_{n-1}$ and the tooth $B_{n-1}$ and the time interval between tooth $B_{n-1}$ and the tooth $C_{n-1}$, and is therefore determined to be in the same increasing trend of rotational speed in the $n^{th}$ cycle as well. The first 9 times of the 60 times the reference signal will be generated is set as a reference signal of 16+1=17 μs, the remaining 51 times will be a reference signal of 16 μs, and the increasing trend of the rotational speed is incorporated into the reference signal as well.

In this manner, the precision of the reference signal is improved and high precision measurement and control can be carried out because the slope of a change in rotational speed is also added between a plurality of reference signals generated in a tooth interval by reflecting the rotational trend (increase/decrease in rotational speed) of past cycles of the same tooth in the mode for generating reference signals.

In this case, the rotational trend thus incorporated is obtained from the same tooth from the preceding cycle, but it is also possible to obtain the rotational trend from two cycles prior, or three cycles prior to the current cycle. However, the precision of the resolution worsens to the extent that cycles chronologically older than the cycle used for prediction are used. In the case of a 4-cycle engine, a single cycle is two rotations, and it therefore appears that the rotational trend is better obtained from the same tooth of ½ cycle prior, i.e., a single rotation prior, but as described above, the value and trend (increasing/decreasing) of the rotational speed differs depending on the stroke, i.e., intake, compression, combustion, and exhaust. Therefore, the trend of the same stroke is preferably reflected, and the trend of ½ cycle prior should not be reflected because the trend is from a separate stroke.

In the same manner as described above in the case of a multi-cylinder engine, if the trend of ½ cycle prior were to be used, the rotational trend of a different cylinder would be reflected even if the stroke was the same. Therefore, the rotational trend of the $(n-k)^{th}$ (n, k: natural numbers; n>k) cycle is preferably used to reflect the rotational trend of the same cycle of the same cylinder.

EXAMPLES

Figure 3:
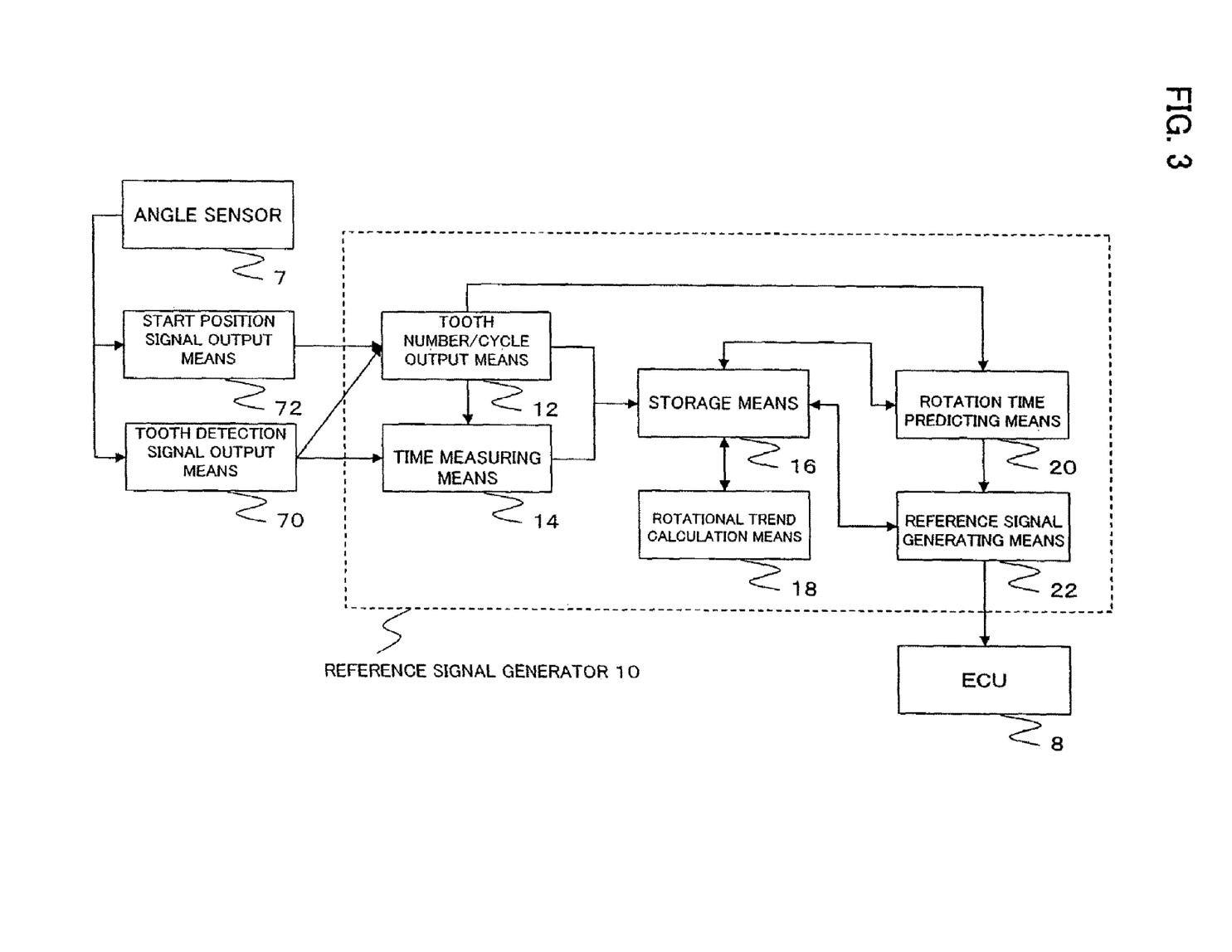
FIG. 3 is a schematic block diagram of the reference signal generator of the present invention.

Next, specific examples of the reference signal generator of the present invention will be described. FIG. 3 is a schematic block diagram of a reference signal generator 10. The reference signal generator 10 is provided with tooth number/cycle output means 12, time measuring means 14, storage means 16, rotational trend calculating means 18, rotation time predicting means 20, and reference signal generating means 22

The tooth number/cycle output means 12 outputs a start position signal outputted by the start position signal output means 72, and, on the basis of a tooth detection signal outputted from the tooth detection signal output means 70, the tooth numbers of the teeth of the disk mounted on the crankshaft of the engine and the rotation cycle of the engine. Tooth numbers are assigned in sequence to teeth that have passed by the angle sensor 7, taking advantage of the fact that the start position signals are outputted after the ECU 8 has started measurement and control (after the engine has started to rotate). The cycle is obtained by counting the start position signals (in the case of a 4-cycle engine, a single cycle is the detection of two start position signals).

In the present example, the number of teeth is 58 (two missing teeth) set at 6 degree intervals, but since a 4-cycle engine is used, the tooth numbers 0 through 117 are assigned. In other words, the same tooth [is assigned a tooth number such that] the tooth number of the second rotation of the first cycle is the tooth number of the first cycle plus 58.

The time measuring means 14 takes advantage of the tooth detection signal outputted from the tooth detection signal output means 70. The time measurement is carried out in an interval that lasts until the next tooth detection signal is outputted, i.e., the time interval between adjacent teeth. The measured time is hereinafter referred to as "actual rotation time data." An example of the time measuring means 14 is a counter that counts up at each reference time (e.g., 1 μs).

The storage means 16 is means for correlating and storing tooth numbers and cycles from the tooth number/cycle output means 12 and actual rotation time data measured by the time measuring means 14. The storage means 16 has the capacity that makes it possible to store the data of at least one previous cycle (totaling two cycles), and the storage data may be overwritten each time the cycle changes. Also, the storage means 16 is not limited to RAM, and a buffer may be used.

The rotational trend calculating means 18 is means for calculating, based on the tooth number stored in the storage means 16 and the actual rotation time data, the increases/decreases in the rotation speed and other rotational trends of the engine 1 when a tooth having the tooth number is detected by the angle sensor 7. This rotational trend is stored in the storage means 16. For example, the case in which the rotation time (the time from when the angle sensor 7 detects the tooth 6 until the angle sensor detects tooth 11) of tooth 6 is 1,200 μs and the rotation time (the time from when the angle sensor 7 detects the tooth 11 until the angle sensor detects tooth 13) of tooth 11 is 1,000 μs would mean that the rotational speed at tooth 11 is in an increasing trend. If the magnitude of the rotation times were reversed, this would mean that the rotational speed is in a decreasing trend. The most simple method to express whether the rotational trend is increasing or decreasing is to use a binary value (1 bit), but the difference (in this example, 1,200−1,000=+200) in the rotation time may be stored in the storage means 16 as a signed numerical value.

The rotation time predicting means 20 is means for predicting an unknown rotation time (the time from when the angle sensor 7 detects a certain tooth of a certain cycle until the angle sensor 7 detects the next tooth) by reflecting the rotational trend of a past cycle of the same tooth in the actual rotation time data of the tooth immediately prior to the detected tooth. The rotation time predicting means 20 predicts the rotation time of the interval $B_n$-$C_n$ by applying the known relationship between the interval $A_{n-1}$-$B_{n-1}$ and the interval $B_{n-1}$-$C_{n-1}$ to the relationship between the interval $A_n$-$B_n$ and the interval $B_n$-$C_n$ (the time of the interval $A_n$-$B_n$ is known), wherein the interval of the teeth for which rotation time prediction is desired is used as the interval $B_n$-$C_n$ (n: cycle), as described earlier with reference to FIG. 2.

Specifically, the rotation time predicting means 20 calculates [measurement time] using [the formula] t(interval $B_n$-$C_n$)=t(interval $A_n$-$B_n$)−(t(interval $A_n$-1-$B_n$-1)−t(interval $B_n$-1-$C_n$-1)) for the case in which the measured time of the interval $A_n$-$B_n$ is expressed as t (interval $A_n$-$B_n$) The time during which the rotation angle (in the present example, the tooth that is 6 degrees ahead) that allows measurement and control to be carried out is detected by the angle sensor 7, i.e., the rotational speed or the rotation time of the tooth $B_n$ is predicted.

The reference signal generating means 22 is means for generating a reference signal, in which the rotation angle within the rotation time predicted by the rotation time predicting means 20 has been given a higher resolution, in correspondence to the rotation angle until the angle sensor 7 detects the next tooth. The reference signal generating means 22 of the present embodiment has a feature that incorporates the rotational trend of a past cycle of the same tooth, and generates a highly precise reference signal (the tracking and correlation of the rotation angle and rotation time are highly accurate).

This is described earlier with reference to FIG. 2. In other words, the reference signal generating means 22 determines the desired ratio 1/a (fraction) of improvement (subdivision) of the physical angular resolution obtained by the teeth when the rotation time calculated by the rotation time predicting means 20 is divided, and the predicted rotation time is divided by (1/ratio). The quotient X and remainder Y (both are natural numbers) are calculated thereby, thus generating Y number of reference signals every (X+1) seconds and (a−Y) number of reference signals every X seconds.

The mode for generating a reference signal, i.e., whether the reference signal of the time interval selected from the two types of reference signals described above is generated is furthermore determined in accordance with the rotational trend of a past cycle of the same tooth. When the rotational trend of the preceding cycle is an increasing trend, the reference signal of the interval that lasts (X+1) seconds is generated first, and when the rotational trend is conversely a decreasing trend, the reference signal of the interval that lasts X seconds is generated first. In this manner, the slope of the rotational speed is added not only to the extrapolated rotation time, but also to the interpolated reference signal by incorporating the rotational trend to the reference signal generation mode, leading to a likely improvement in the precision of the angular resolution.

In this case, the purpose of the reference signal generator 10 of the present embodiment is to predict the unmeasured rotation time in real time, generate a reference signal that corresponds to a rotational angle having high resolution in the interval from when the tooth used for prediction is detected until the next tooth is detected, and carry out highly precise ECU-based measurement and control. Also, in order to use in the predictions the actual rotation time data of the tooth that immediately precedes the tooth to be predicted, the rotation time predicting means 20 must immediately perform computations for prediction and reference signal generation, and must then generate a reference signal.

This problem may be easily solved by using a high-speed CPU, but costs increase as higher-speed CPUs are used. A program that determines the mode for generating a reference signal by performing division in the manner described above and using the quotient and remainder of the result cannot be formed into a simple flowchart, no matter the speed of the CPU that is used to execute a software program. For this reason, it is possible that by the time that this processing is completed, a reference signal should already have been generated and real time processing cannot be achieved.

Real time processing in ECU-based measurement and control is particularly needed for fuel injection and ignition timing when the effect on fuel costs and the amount exhaust gas emissions is considerable (when the rotational speed is low and the variation in the rotational speed is large), and if this control is carried out after the rotational state has changed, it is meaningless to predict rotation time and to generate a reference signal having a high angular resolution. The term "real time" in the present specification refers to the situation in which the prediction of the rotation time and the computation of the reference signal are completed before the reference signal for measurement and control is outputted.

Therefore, in the present example as described below, a reference signal generator is constituted by a simple combination of hardware that does not perform multiplication or division, does not require software programming, and in which real time rotation time prediction and reference signal generation is achieved.

In other words, the time measuring means 14 of the present example is composed of an a-base counter (wherein a is the denominator of the fractional ratio of the desired improvement (subdivision) in the physical resolution obtained by the number of teeth.). For example, when an angular resolution of 0.1 degree is desired in a disk in which teeth are provided at 6 degree intervals, a=60 and the time measuring means 14 is a sexagesimal counter. When an angular resolution of 0.1 degree is desired in a disk in which teeth are provided at 10 degree intervals, a=100 and the time measuring means 14 is a centesimal counter.

In the present example, the reference signal is set to 1 µs, the sexagesimal counter sequentially counts from 1 to 59 until 1 µs has elapsed. Once the count has reached 59, the count subsequently overflows and a +1-incremented value is stored in an internal buffer of the storage means 16 or the counter. This operation is repeated in the interval from when an arbitrary tooth is detected until the next tooth is detected, and when the next tooth is detected, the number of times that an overflow has occurred (the quotient X) and the final value (remainder Y) counted by the counter when the next tooth has been detected is correlated with the tooth number and the cycle and stored in the storage means 16.

In this manner, the actual rotation time data of the teeth is stored as an a-divided quotient and remainder by using output value of the counter without the use of division processing, whereby the rotation time is thereafter predicted in the same manner using the quotient and the remainder, and real time measurement and control by the ECU is achieved because a reference signal can be generated immediately by using only addition and subtraction of the predicted quotient and remainder.

Figure 4:
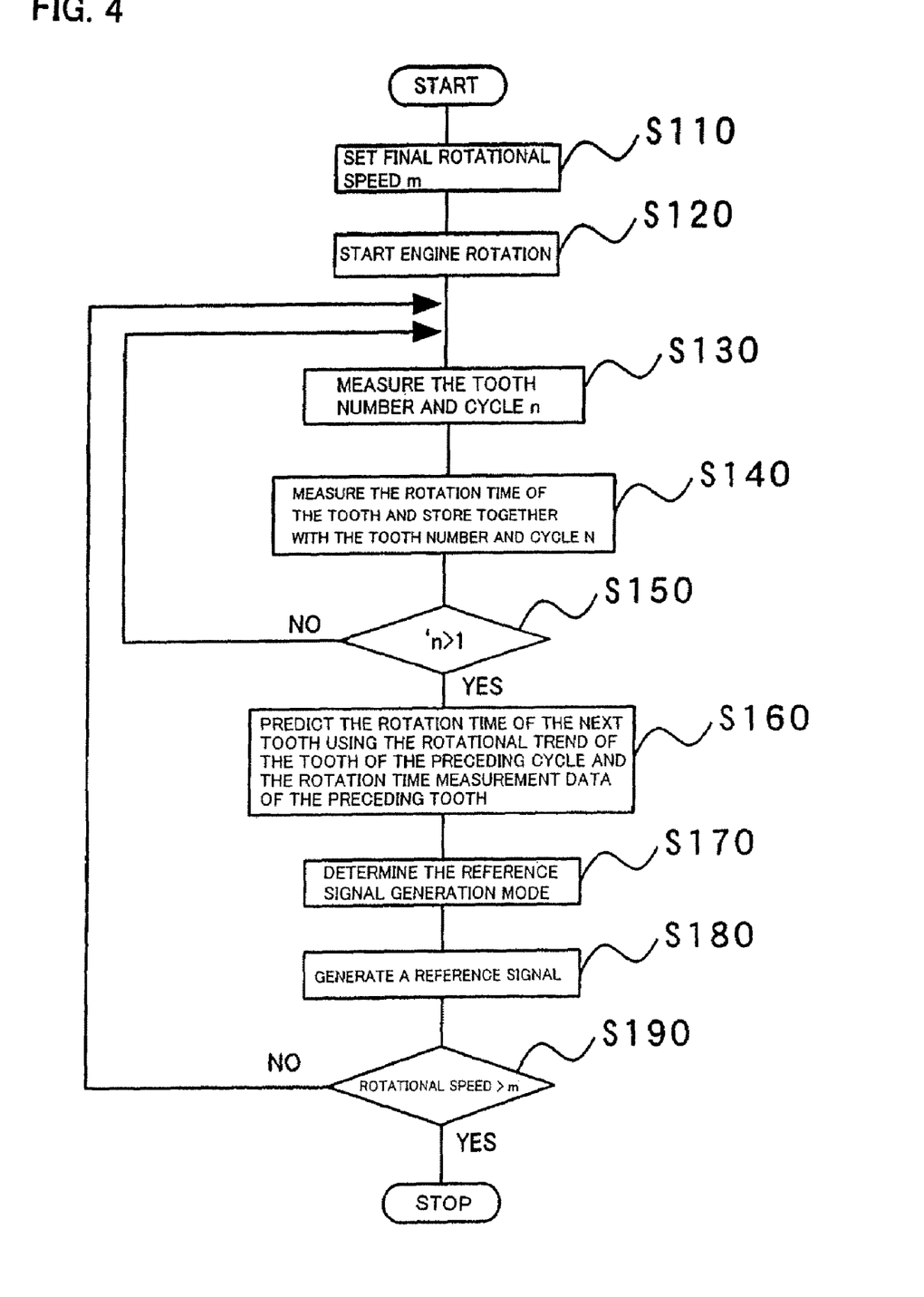
FIG. 4 is a flowchart showing an example of the operation of the reference signal generator of the present invention.

Next, the specific operation for the case in which the measurement and control of the engine is carried out by the ECU 8 using the reference signal generator 10 is described with reference to the schematic diagram in FIG. 3 and the flowchart in FIG. 4. In the present example, a disk 5 having teeth 6 provided at 6 degree intervals is mounted on the crankshaft 3 of an engine 1 to be tested, as shown in FIG. 1. The rotational angle is detected when the angle sensor 7 sequentially detects the teeth 6, the start position signal output means 72 and the tooth detection signal output means 70 are connected to the reference signal generator 10, and the reference signal generator 10 is connected to the ECU 8.

First, the rotational speed of the engine 1 is set as an engine test condition. In this case, the final rotational speed m is set (S110), and this is used as the test-ending (stopping the driving of the engine) condition. The rotation of the engine 1 is then started (S120).

The tooth number/cycle output means 12 sequentially determines the tooth number and cycle n on the basis of the signals from the start position signal output means 72 and the tooth detection signal output means 70.

The time measuring means 14 detects the tooth number and measures the time until the next tooth number is detected. The actual rotation time data thus measured is correlated with the tooth number and the cycle n measured in S130, and stored in the storage means 16 (S140). The rotational speed is also preferably calculated and stored at this time on the basis of the cycle n and the actual rotation time data.

In the present example, the time measuring means 14 is a sexagesimal counter that measures time in increments of 1 µs, and the actual rotation time data is expressed by a numerical value (quotient) obtained by adding +1 for each overflow occurrence of the sexagesimal counter, and by the value (remainder) of the count at a midway point when the next tooth is detected. The data is stored in the storage means 16. The reason that a sexagesimal counter is used is that the resolution of the rotational angle is 0.1 degree, i.e., 1/60 of the current 6 degrees between the teeth, and the step for dividing by 60 is eliminated when the reference signal is generated.

At this time, the rotational trend is also preferably stored in the storage means 16. In the present example, a value is stored together with the quotient$_{x+1}$ and remainder$_{x+1}$ as the rotational trend$_{x+1}$ of the tooth T$_{x+1}$, namely: 0, if the relationship between the quotient$_x$ and remainder$_x$ of a tooth T$_x$ and the quotient$_{x+1}$ and remainder$_{x+1}$ of the next tooth T$_{x+1}$ is quotient$_{x+1}$<quotient$_{x+1}$; 1, if the relationship is quotient$_x$>quotient$_{x+1}$; 0, if the relationship is remainder$_x$≦remainder$_{x+1}$ when quotient$_x$=quotient$_{x+1}$; and 1, if the relationship is remainder$_x$>remainder$_{x+1}$ when quotient$_x$=quotient$_{x+1}$. A rotational trend of 0 indicates that the rotational speed is decreasing, and a rotational trend of 1 indicates that the rotational speed is increasing.

In this case, cycle n>1, i.e., the rotation time cannot be predicted when the cycle is the first cycle (S150) and the process returns to S130, but in the second cycle and thereafter, the rotation time predicting means 20 predicts (S160) the rotation time of the tooth that follows the tooth stored in the storage means 16 immediately prior in S140.

Figure 5:
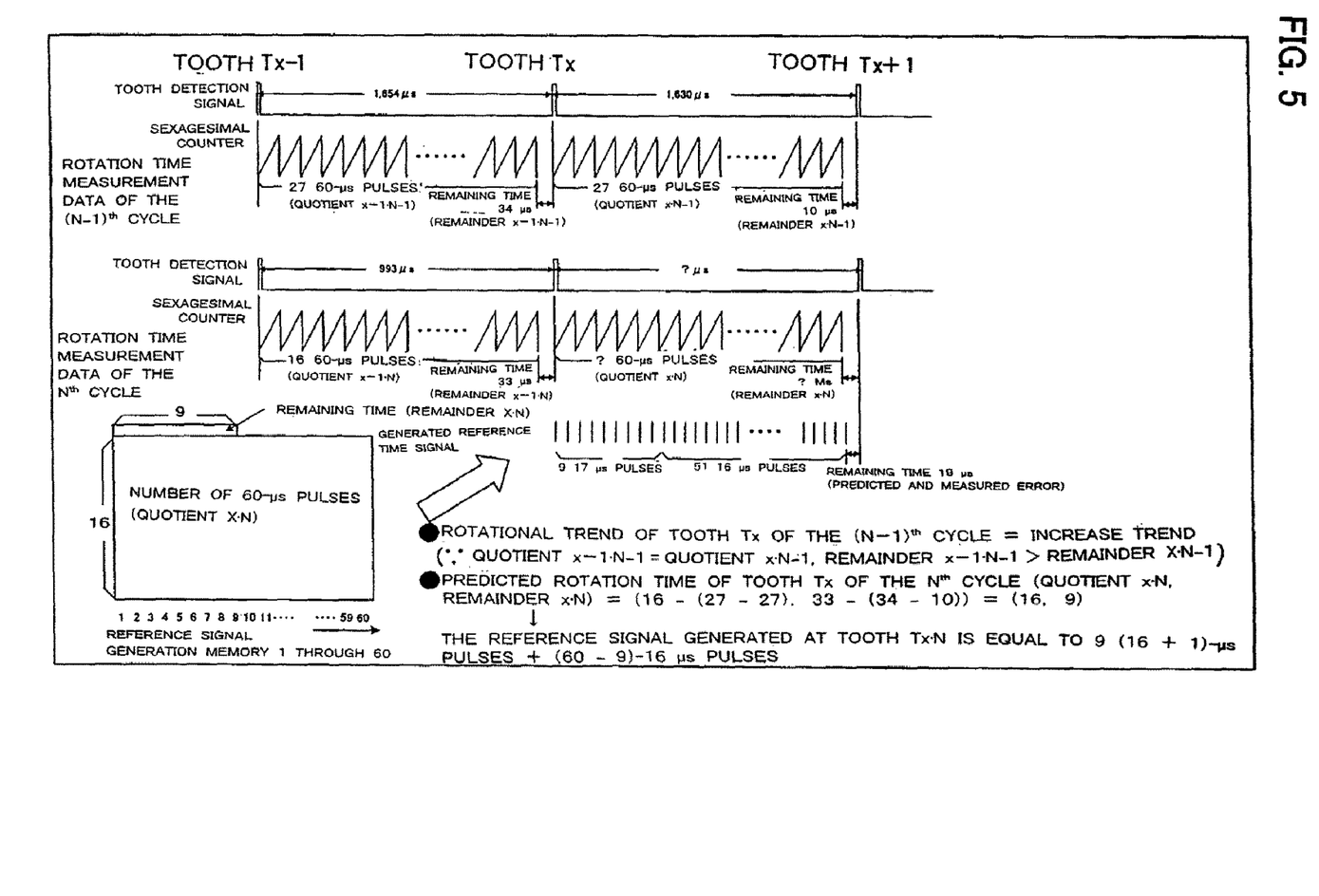
FIG. 5 is a diagram showing an example of a specific technique for predicting the rotation time and generating a reference signal.

Here, when the rotation time of the tooth $T_x$ (expressed as tooth $T_{x \cdot N}$) of the $N^{th}$ cycle is to be predicted, the rotation time predicting means 20 calculates quotient$_{x \cdot N}$=quotient$_{x-1 \cdot N}$−(quotient$_{x-1 \cdot N-1}$−quotient$_{x \cdot N-1}$), and remainder$_{x \cdot N}$=remainder$_{x-1 \cdot N}$−(remainder$_{x-1 \cdot N-1}$−remainder$_{x \cdot N-1}$). FIG. 5 shows this calculation process using specific numerical values. The quotient$_{x \cdot N}$ and remainder$_{x \cdot N}$ constitute the predicted rotation time for the tooth $T_{x \cdot N}$.

Depending on the value of the actual rotation time data, there are cases in which the result of calculating remainder$_{x \cdot N}$=remainder$_{x-1 \cdot N}$−(remainder$_{x-1 \cdot N-1}$−remainder$_{x \cdot N-1}$) is less than 0 (minus) or 60 or higher. When the remainder$_{x \cdot N}$ is less than 0, 1 is subtracted from the calculated value of the quotient$_{x \cdot N}$, and 60 is added to the remainder$_{x \cdot N}$, whereby the quotient and remainder obtained by dividing the rotation time by 60 can be separated. Also, when the remainder$_{x \cdot N}$ is 60 or higher, 1 is added to the calculated value of the quotient$_{x \cdot N}$, and 60 is subtracted from the remainder$_{x \cdot N}$, whereby the quotient and remainder obtained by dividing the rotation time by 60 can be separated.

The reference signal generating means 22 determines (S170), based on the rotation time of the tooth $T_{x \cdot N}$ predicted in S160, the mode for generating a reference signal that has been subdivided so that the rotational angle between the tooth $T_{x \cdot N}$ and the next tooth $T_{x+1 \cdot N}$ has a prescribed resolution.

First, a total of 60 reference signal generation memory units, to which tooth numbers 1 to 60 are assigned, are prepared in the storage means 16, and the reference signal generating means 22 stores the values of the quotient$_{x \cdot N}$ of the tooth $T_{x \cdot N}$ in the memory units 1 to 60, respectively. The number of reference signal generation memory units is the same as the numerical base (the numerical value a obtained based on the resolution) of the counter of the time measuring means 14.

Next, a determination is made as to whether the rotational trend$_{x \cdot N-1}$ of the tooth (tooth $T_{x \cdot N-1}$) of the preceding cycle, which is the same tooth as the tooth used to generated a reference signal, is 0 or 1.

If the rotational trend is 1 (i.e., an increasing trend), 1 is added to the value of the quotient$_{x \cdot N}$ stored in memory units 1 through (value of remainder$_{x \cdot N}$). If the rotational trend is 0 (i.e., an decreasing trend), 1 is added to the value of the quotient$_{x \cdot N}$ stored in memory units (value of 60−remainder$_{x \cdot N}$+1) through 60.

In this manner, the reference signal generating means 22 begins to output, based on the values stored in memory units 1 through 60, reference signals to the ECU 8 immediately after the tooth $T_{x \cdot N}$ has been detected.

Specifically, first, the value stored in memory unit 1 is read, the value of the counter, which counts in increments of 1 μs, continues to count until the stored value is reached, and when the count is equal to the stored value, a reference signal is outputted via a pulse signal or the like. Next, a memory number counter is incremented and the stored value of memory unit 2 is read. A reference signal is outputted when the value of the counter becomes equal to the stored value in the same manner as the case of memory unit 1. This process is repeatedly executed until the memory number counter reaches 60 (until the final memory unit 60 is reached). In the example shown in FIG. 5, it is known that the rotational trend of a past cycle is an increasing trend, and the trend is therefore the same at tooth $T_{x \cdot N}$, information related to reference signals having a long count time is stored in memory units having a smaller number, and information related to reference signals having a short count time are subsequently stored. The slope of the increasing trend of the rotation can thereby also be added to the angular resolution obtained via the reference signal, and the tracking and correlation of the rotation angle and rotation time are improved.

However, when the detection signal of next tooth $T_{x+1 \cdot N}$ is outputted from the tooth detection signal output means 70 before the reference signals are outputted up to the final memory unit 60, the generation of reference signals is ended at that point and the remaining stored values in the memory are not counted.

In the case of the actual rotation time data shown in FIG. 5, 9 17-μs pulses and 50 16-μs pulses for a total of 60 pulses are outputted as a reference signal having an angular resolution of 0.1 degree. For example, when fuel injection control or the like is desired at a position 3 degrees advanced from the tooth $T_{x \cdot n}$, the control may be carried out based on the 30$^{th}$ outputted reference signal because 3 degrees is half of the angular resolution of 6 degrees between the teeth.

If the rotation number n reaches (S190) the final rotational number m set in S110, the test ends and the rotation of the engine 1 stops.

The reference signal generator 10 described above is composed of hardware alone such as an adder-subtractor, a comparator, and a counter, and multiplication and division are not used. Therefore, the rotation time of the next tooth is predicted and the reference signal generation mode is determined in real time, a reference signal required for measurement and control can be generated immediately, and real time measurement and control is achieved.

Also, the correlation between the rotation angle and rotation time is high even when the angle resolution between the teeth has been improved because the rotation time is predicted in response to a rotational state that changes moment to moment and a reference signal is generated while incorporating the rotational trend of a past cycle of the same tooth.

Figure 6A:
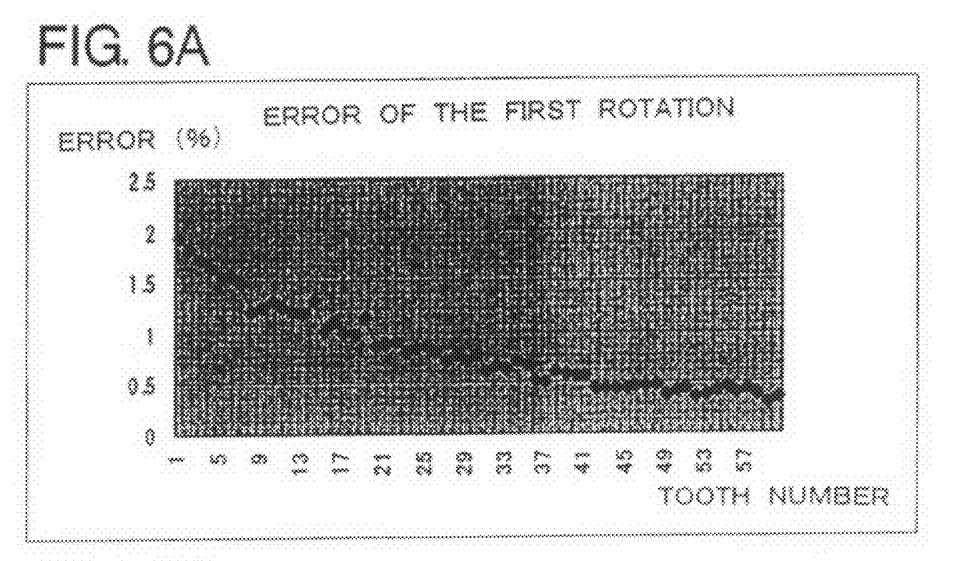
FIG. 6 is a graph showing as a percentage the error between the predicted result and the actual measurement result of the rotation time.
Figure 6B:
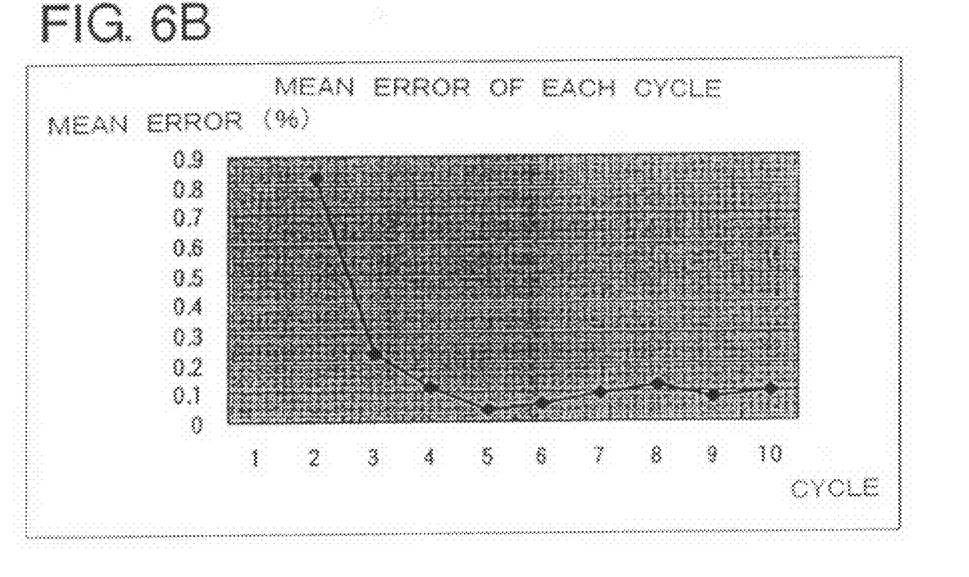

In accordance with the predicted result of the rotation time shown in FIG. 5, there is an error of 19 μs between the predicted rotation time and the measured rotation time. In order to verify this error in view of this result, FIG. 6 shows a graph that expresses as a percentage the error between the predicted result and the measured result of the rotation time for all of the teeth of the second cycle and thereafter when the engine is made to rotate at a uniformly increasing rate of an initial speed of 600 rpm to an end speed of 6,000 rpm. FIG. 6A is a graph that expresses the error for tooth numbers 1 through 60 of the second cycle, and FIG. 6B is a graph in which the errors of tooth numbers 1 through 60 are averaged for each cycle.

According to FIG. 6, it is apparent that the error is reduced as the rotational speed increases, and the error remains within 0.9% in the second cycle of the lowest rotational speed, and this is in a range that allows the reference signal generator to be used in practical applications.

Particularly important in ECU measurement and control is measurement and control when the rotation speed is low (e.g., when traveling slowly uphill immediately after movement has started). When the rotation speed is low, the slope of the change in the rotation speed is greater than when the rotational speed is high. Therefore, measurements and control must be carried out immediately with good precision in accordance with changes in the rotational speed in order to reduce exhaust gas pollution, improve fuel consumption, and achieve other aims. Therefore, it is expected that the reference signal generator of the present invention can endure practical applications even at low rotational speeds and will be sufficiently useful for conventional ECU-based real time measurement and control.

Examples of the reference signal generator and method were described above, but the reference signal generator and method of the present invention are not limited to the reference signal generator and method provided with all of the constituent elements described in the examples above, and various modifications and revisions are possible. It shall be apparent that the modification and revisions remain within the scope the patent claims of the present invention.

In relation to the determination of the reference signal generation mode, for example, a determination was made in an earlier example as to whether the value of the remainder of the predicted rotation time is stored in the first half (lower numbered memory units) or the second half of the reference signal generation memory in accordance with the two options, i.e., whether the rotational trend of a previous cycle is 0 or 1, and a slope corresponding to the rotational trend was thereby added to the reference signals. However, when the change in the rotational speed is extremely great, the reference signal generation mode can be determined using the following method so as to improve the precision of a 0.1 degree angular resolution.

Figure 7:
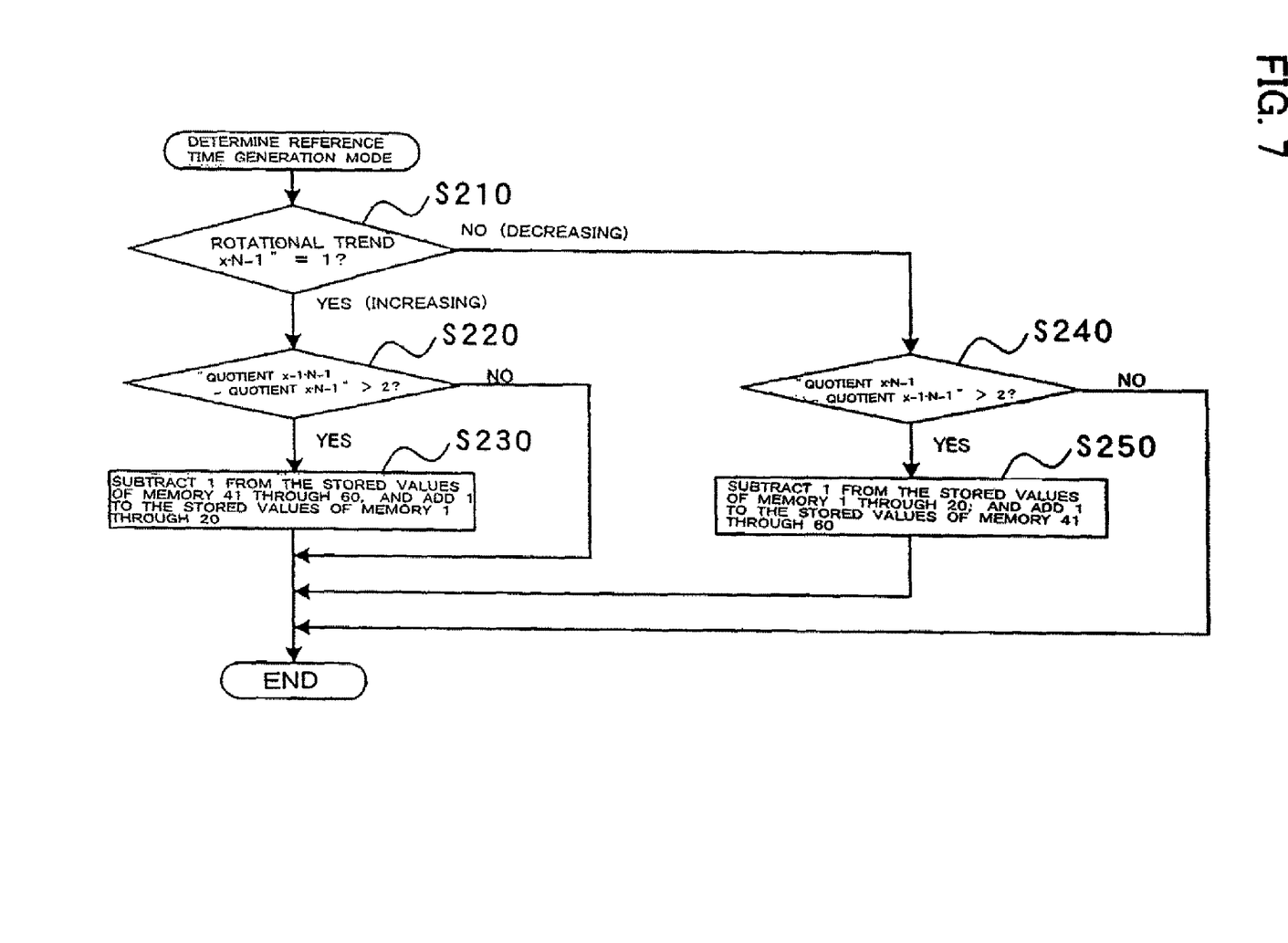
FIG. 7 is a flowchart showing another example of determining the mode for generating a reference signal.

In other words, the reference signal generating means 22 stores a numerical value in the reference signal generation memory units 1 to 60, and the flowchart in FIG. 7 is followed thereafter.

In FIG. 7, a determination is made as to whether the rotational trend$_{x \cdot N-1}$ is 0 or 1 (S210), and when it is determined that the absolute value of the difference between the quotient$_{x-1 \cdot N-1}$ and the quotient$_{x \cdot N-1}$ is 2 or greater for each case, i.e., that the change in the rotation speed is considerable (S220, S240), the values stored in memory units 1 through 60 are finely adjusted.

Figure 8:
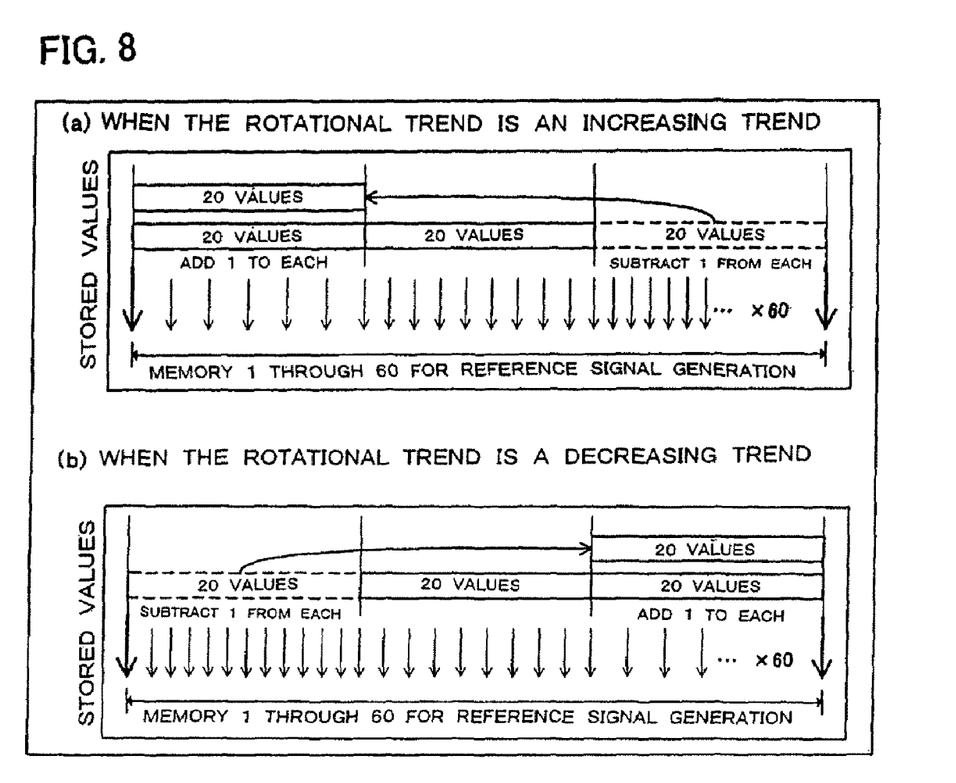
FIG. 8 is a diagram showing an image of addition and subtraction of values stored in memory.

In the specific case that the rotational trend is an increasing trend and the change in rotational speed is great, 1 is subtracted from the values stored in memory units 41 through 60, as shown in FIG. 8A, and 1 is added to the values stored in memory units 1 through 20 (S230). When the rotational trend is a decreasing trend and the change in rotational speed is great, 1 is subtracted from the values stored in memory units 1 through 20, as shown in FIG. 8B, and 1 is added to the values stored in memory units 41 through 60 (S250). The method of generating a reference signal is the same as described above based on the values stored in the memory units 1 though 60 determined in this manner.

In this manner, a drop in the reference signal generated in relation to the tooth that subsequently predicts the rotation time is smoothed and the precision of the measurement and control is improved by changing the mode for generating a reference signal in accordance with the amount of change (the magnitude of the slope) of the rotational speed, and making the reference signal follow changes in the rotational speed.

In the examples above, the rotation time of the tooth $T_{x \cdot N}$ is predicted first using the quotient$_{x \cdot N}$ and the remainder$_{x \cdot N}$, and is thereafter stored as a numerical value in the reference signal generation memory units 1 through 60 on the basis of the quotient$_{x \cdot N}$, the remainder$_{x \cdot N}$, and the rotation trend$_{x \cdot N-1}$ to generate a reference signal. However, the prediction performed by the rotation time predicting means 20 and the reference signal generated by the reference signal generating means 22 may be carried out simultaneously while making use of reference signal generation memory (i.e., simultaneously executing S170 and S180 of the flowchart of FIG. 4).

In other words, the rotation time predicting means 20 (and reference signal generating means 22) detects the count value (number of overflow occurrences) of the tooth $T_{x-1 \cdot N}$ immediately prior to the tooth $T_{x \cdot N}$ from the time measuring means 14 (a sexagesimal counter), and adds 1 to the reference signal generation memory units 1 through 60 each time an overflow is generated. When the difference between quotient$_{x-1 \cdot N-1}$ and quotient$_{x \cdot N-1}$ is calculated and quotient$_{x-1 \cdot N-1} \geqq$ quotient$_{x \cdot N-1}$, the absolute value of the difference is subtracted from the values stored in the memory units 1 though 60, and conversely, when the quotient$_{x-1 \cdot N-1}$<quotient$_{x \cdot N-1}$, the absolute value of the difference is added to the values stored in the memory units 1 though 60.

Next, the remainder$_{x \cdot N}$ is calculated from the expression remainder$_{x-1 \cdot N}$−(remainder$_{x-1 \cdot N-1}$−remainder$_{x \cdot N-1}$), and when the computational result is less than 0, 1 is further subtracted from the values stored in the memory units 1 through 60, and 60 is added to the calculated remainder to obtain the remainder$_{x \cdot N}$. When the computational result is 60 or higher, 1 is added to the values stored in the memory units 1 through 60, and 60 is subtracted from the calculated remainder to obtain the remainder$_{x \cdot N}$. At this point, the values stored in memory units 1 through 60 are the quotient$_{x \cdot N}$.

Next, if the rotational trend$_{x \cdot N-1}$=1, 1 is added to the values stored in the memory units 1 through (remainder$_{x \cdot N}$), and if the rotational trend$_{x \cdot N-1}$=0, 1 is added to the values stored in the memory units (60−remainder$_{x \cdot N}$1) through 60.

The prediction of rotation time and the determination of the reference signal generation mode are thereby carried out in unison.

Described in the present specification was an example of reference signal generation for detecting a rotational angle at high resolution in an engine in which a series of strokes composed of intake, compression, combustion, and exhaust is repeated as a single cycle, and in which the effect of this cycle is manifest in the rotation output characteristics (e.g., a change in the rotational speed), but if the rotating object is one in which the rotation output characteristics are known to be cyclical, the reference signal generator and method of the present invention can be applied to rotating objects other than an engine.

The invention claimed is:

1. A reference signal generator in which an angle sensor fixedly disposed on a rotating object sequentially detects a plurality of teeth that are mounted at fixed angular intervals on said rotating object, the plurality of teeth comprising a first tooth, a second tooth, and a third tooth, said first tooth and second tooth being adjacent, said first tooth and said third tooth being adjacent, whereby a time interval between adjacent teeth is measured and a measurement and control reference signal that corresponds to an arbitrary rotational angle is generated, said reference signal generator comprising:

rotational trend calculating means for calculating increasing, decreasing and other rotational trend in the rotational speed of said rotating object at a time when said first tooth is detected by said angle sensor in an n−k$^{th}$ cycle of rotation of said rotating object (n, k: natural numbers, and n>k), said calculated rotational trend based on a first time interval between the second tooth and the first tooth, the second tooth detected immediately prior to the first tooth in the (n−k)$^{th}$ cycle, and a second time interval between said first tooth and the third tooth, the third tooth detected immediately after said first tooth in said n−k$^{th}$ cycle;

rotation time predicting means for predicting the time interval between said first tooth and said third tooth in the n$^{th}$ cycle, wherein the predicted time interval is based upon a time interval between said second tooth and said first tooth in the n$^{th}$ cycle, a difference among the first time interval and second time interval, and the calculated rotational trend; and reference signal generating means for generating a reference signal during a time interval between a time at which said angle sensor detects said first tooth in the n$^{th}$ cycle and an approximate time at which said angle sensor detects said third tooth, the reference signal having a plurality of pulses wherein number and time spacing of the plurality of pulses is determined at least in part by subdividing said predicted time interval according to a prescribed angular resolution.

2. The reference signal generator according to claim 1 wherein said reference signal generating means generates the reference signal based upon a mode determined according to the rotational trend.

3. The reference signal generator according to claim 1 or 2, wherein said rotational trend calculating means calculates as said rotational trend a degree of variation in the rotational speed of said rotating object at a time when said first tooth is detected by said angle sensor in said $(n-k)^{th}$ cycle.

4. The reference signal generator according to claim 1 or 2, wherein said rotation time predicting means expresses the time interval measured between said teeth as a quotient and remainder found by dividing the time interval by the numerical value obtained based on said resolution, and said quotient and remainder are obtained based on an output value of a counter that overflows for each numerical value obtained based on said resolution.

5. The reference signal generator according to claim 1 or 2, wherein said rotating object is an automobile engine; and said reference signal is used in measuring at least one of rotational torque, rotational speed or other rotational parameter of said engine and/or for controlling an injection amount of fuel and injection and ignition timing via an ECU.

6. The reference signal generator according to claim 1, wherein said rotation time predicting means expresses the time interval measured between said teeth as a quotient and remainder found by dividing the time interval by the numerical value obtained based on said resolution, wherein the reference signal generating means generates the plurality of pulses with a first time spacing corresponding to said quotient for a first subset of the plurality of pulses and with a second time spacing for a second subset of said plurality of pulses, wherein the number of pulses in the second subset corresponds to the remainder, said second time spacing differing from said first time spacing.

7. The reference signal generator according to claim 6, wherein said rotational trend determines order of said first subset relative to said second subset.

8. A reference signal generating method in which an angle sensor fixedly disposed on a rotating object sequentially detects a plurality of teeth that are mounted at fixed angular intervals on said rotating object, said plurality of teeth comprising a first tooth, a second tooth and a third tooth, said first tooth and second tooth being adjacent, said first tooth and said third tooth being adjacent, whereby a time interval between adjacent teeth is measured and a measurement and reference signal generation means generate a measurement and control reference signal that corresponds to an arbitrary rotational angle is generated, said reference signal generating method comprising:

calculating increasing, decreasing and other rotational trend in the rotational speed of said rotating object at a time when said first tooth is detected by said angle sensor in an $n-k^{th}$ cycle of rotation of said rotating object (n, k: natural numbers, and n>k), said calculated rotational trend based on a first time interval between the second tooth and the first tooth, the second tooth detected immediately prior to the first tooth in the $(n-k)^{th}$ cycle, and a second time interval between said first tooth and the third tooth, the third tooth detected immediately after said first tooth in said $n-k^{th}$ cycle;

predicting time interval between said first tooth and said third tooth in the $n^{th}$ cycle based upon a time interval between said second tooth and said first tooth in the $n^{th}$ cycle, a difference among the first time interval and second time interval, and the calculated rotational trend; and generating a reference signal during a time interval between a time at which said angle sensor detects said first tooth in the $n^{th}$ cycle and an approximate time at which said angle sensor detects said third tooth, the reference signal having a plurality of pulses wherein number and time spacing of the plurality of pulses is determined at least in part by subdividing said predicted time interval according to a prescribed angular resolution.

9. The reference signal generating method according to claim 8, further comprising determining a reference signal generation mode based upon the rotational trend, and wherein said step of generating the reference signal is based upon the determined mode.

10. The reference signal generating method according to claim 6 or 9, wherein said reference signal generating method calculates as said rotational trend a degree of variation in the rotational speed of said rotating object at a time when said first tooth is detected by said angle sensor in said $(n-k)^{th}$ cycle.

11. The reference signal generating method according to claim 6 or 9, wherein said reference signal generation means expresses the time interval measured between said teeth as a quotient and remainder found by dividing the time interval by the numerical value obtained based on said resolution, and predicts the time interval based on said quotient and remainder; and said quotient and remainder are obtained based on an output value of a counter that overflows for each numerical value obtained based on said resolution.

12. The reference signal generating method according to claim 6 or 9, wherein said rotating object is an automobile engine, and said reference signal is used in measuring at least one of rotational torque, rotational speed or other rotational parameter of said engine and/or for controlling an injection amount of fuel and injection and ignition timing via an ECU.

13. The reference signal generating method according to claim 8, wherein said reference signal generation means expresses the time interval measured between said teeth as a quotient and remainder found by dividing the time interval by the numerical value obtained based on said resolution, wherein the reference signal generating means generates the plurality of pulses with a first time spacing corresponding to said quotient for a first subset of the plurality of pulses and with a second time spacing for a second subset of said plurality of pulses, wherein the number of pulses in the second subset corresponds to the remainder, said second time spacing differing from said first time spacing.

14. The reference signal generating method according to claim 13, wherein said rotational trend determines order of said first subset relative to said second subset.

* * * * *